United States Patent
Fassbender et al.

(10) Patent No.: US 11,978,916 B2
(45) Date of Patent: May 7, 2024

(54) BATTERY PACK

(71) Applicant: MILWAUKEE ELECTRIC TOOL CORPORATION, Brookfield, WI (US)

(72) Inventors: Kyle C. Fassbender, Brookfield, WI (US); Yu Zhang, Dongguan (CN); Shang Hong Wang, Dongguan (CN)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/540,621

(22) Filed: Dec. 2, 2021

(65) Prior Publication Data

US 2022/0181734 A1 Jun. 9, 2022

(30) Foreign Application Priority Data

Dec. 4, 2020 (CN) ............. 202011411151.8

(51) Int. Cl.
*H01M 50/247* (2021.01)
*H01M 10/42* (2006.01)
(Continued)

(52) U.S. Cl.
CPC ....... *H01M 50/213* (2021.01); *H01M 10/425* (2013.01); *H01M 50/247* (2021.01); *H01M 50/627* (2021.01); *H01M 2220/30* (2013.01)

(58) Field of Classification Search
CPC ............. H01M 50/213; H01M 50/247; H01M 50/627; H01M 50/425; H01M 2220/30
See application file for complete search history.

(56) References Cited

U.S. PATENT DOCUMENTS

2014/0349142 A1* 11/2014 Kim ................. H01M 50/1245
29/623.2
2015/0044519 A1 2/2015 Rief et al.
(Continued)

FOREIGN PATENT DOCUMENTS

CN 106784496 B 3/2020
CN 210516810 U 5/2020
(Continued)

OTHER PUBLICATIONS

Extended European Search Report for Application No. 21210838.5 dated May 13, 2022 (10 pages).

*Primary Examiner* — Christopher P Domone
*Assistant Examiner* — Jonathan William Estes
(74) *Attorney, Agent, or Firm* — Michael Best & Friedrich LLP

(57) ABSTRACT

A battery pack assembly includes a housing having a plurality of sides and defining an internal cavity, a plurality of battery cells received in the internal cavity, and battery electronics received in the internal cavity. A battery pack interface is supported by the housing and connectable to a device. An injection port is supported by the housing. The injection port includes one or more channels positioned on one or more of the sides of the housing. Each channel connects the internal cavity to an exterior of the battery pack. The injection port is configured to direct a fluid comprising adhesive material from the exterior of the battery pack into the internal cavity. The fluid is configured to cover at least one of a portion of the battery cells and a portion of the battery electronics.

6 Claims, 11 Drawing Sheets

(51) Int. Cl.
    *H01M 50/213*     (2021.01)
    *H01M 50/627*     (2021.01)

(56) References Cited

U.S. PATENT DOCUMENTS

| | | |
|---|---|---|
| 2015/0086830 A1 | 3/2015 | Sun et al. |
| 2015/0303717 A1 | 10/2015 | Schneider et al. |
| 2017/0187083 A1 | 6/2017 | Mueller et al. |
| 2018/0166736 A1 | 6/2018 | Lee et al. |
| 2020/0411924 A1* | 12/2020 | Yun .................... H01M 10/647 |
| 2021/0020881 A1* | 1/2021 | Hilligoss ............. H01M 10/441 |
| 2021/0269643 A1* | 9/2021 | Zheng .................... C08K 7/20 |
| 2022/0384889 A1 | 12/2022 | Radovich et al. |

FOREIGN PATENT DOCUMENTS

| | | | | |
|---|---|---|---|---|
| CN | 211629166 U | 10/2020 | | |
| EP | 0940864 A2 | 9/1999 | | |
| EP | 3671895 A1 | 6/2020 | | |
| KR | 20190107900 A | * 1/2019 | .......... | H01M 10/647 |
| KR | 2019107900 A | * 9/2019 | ............ | H01M 10/42 |
| WO | 2016178315 A1 | 11/2016 | | |

* cited by examiner

BATTERY PACK

CROSS-REFERENCE TO RELATED APPLICATIONS

This application claims foreign priority to co-pending Chinese Patent Application No. 202011411151.8 filed on Dec. 4, 2020, the entire content of which is incorporated herein by reference.

FIELD

The present invention relates to battery packs and, more particularly, to a battery pack configured to receive adhesive material.

BACKGROUND

Typically, electrical equipment, such as a power tool, can be powered by a rechargeable battery pack. The battery pack may be charged in a compatible battery charger.

SUMMARY

In a first aspect, there is provided a battery pack assembly. The battery pack assembly includes a housing having a plurality of sides and defining an internal cavity, a plurality of battery cells received in the internal cavity, and battery electronics received in the internal cavity. A battery pack interface is supported by the housing and connectable to a device. An injection port is supported by the housing. The injection port includes one or more channels positioned on one or more of the sides of the housing. Each channel connects the internal cavity to an exterior of the battery pack. The injection port is configured to direct a fluid comprising adhesive material from the exterior of the battery pack into the internal cavity. The fluid is configured to cover at least one of a portion of the battery cells and a portion of the battery electronics.

Optionally, the housing includes a top housing portion and a bottom housing portion, and the top housing portion includes the injection port.

Optionally, the bottom housing portion includes a battery cell holder configured to retain the plurality of battery cells within the internal cavity, the battery cell holder includes a surface in facing relationship with the top housing portion, the surface configured to support the battery electronics, and the fluid is configured to cover a portion of the surface.

Optionally, the battery electronics includes a printed circuit board and battery contacts extending therefrom, the battery pack interface includes a terminal block enclosing the battery contacts, and the fluid is configured to cover a surface of the printed circuit board.

Optionally, the housing includes a longitudinal axis extending therethrough, each of the one or more channels of the injection port extends along an injection axis, and the injection axis extends at an angle relative to the longitudinal axis.

Optionally, the battery electronics includes a printed circuit board, and an end of the one or more channels of the injection port is positioned proximate a surface of the printed circuit board.

Optionally, the fluid includes thermally conductive silicone encapsulant.

In a second aspect, there is provided a method of manufacturing a battery pack assembly. The method includes assembling at least a portion of a housing of a battery pack assembly, positioning a plurality of battery cells and battery electronics within an internal cavity of the housing, and injecting a fluid comprising adhesive material into the internal cavity by an injection port of the housing such that the fluid covers at least one of a portion of the battery cells and a portion of the battery electronics.

Optionally, assembling at least the portion of the housing includes providing a battery cell holder, and positioning the plurality of battery cells and the battery electronics within the internal cavity includes receiving, by the battery cell holder, the plurality of battery cells, and securing a printed circuit board of the battery electronics to the battery cell holder.

Optionally, injecting the fluid includes covering a surface of the printed circuit board.

Optionally, assembling at least the portion of the housing includes coupling a bottom housing portion to a top housing portion to form the internal cavity, and injecting the fluid includes injecting the fluid through the top housing portion using the injection port.

Optionally, assembling at least the portion of the housing includes assembling a bottom housing portion, and the method further comprising injecting the fluid into the bottom housing portion before coupling a top housing portion to the bottom housing portion.

Optionally, the fluid includes thermally conductive silicone encapsulant.

In a third aspect, there is provided a battery pack assembly. The battery pack assembly includes a housing having a plurality of sides and defining an internal cavity, a plurality of battery cells received in the internal cavity, and battery electronics received in the internal cavity. A battery pack interface is supported by the housing and connectable to a device. A layer comprising adhesive material is positioned within the internal cavity between a portion of the battery cells and a portion of the battery electronics, and a plurality of inner surfaces of the housing. The layer has a continuous surface covering the portion of the battery cells and the portion of the battery electronics. The layer is injectable as a fluid into the internal cavity that is configured to harden to form the layer.

Optionally, the battery pack assembly further comprises an injection port configured to direct the fluid from exterior of the battery pack into the internal cavity.

Optionally, the housing includes a top housing portion and a bottom housing portion, and the top housing portion includes the injection port.

Optionally, the bottom housing portion includes a battery cell holder configured to retain the plurality of battery cells within the internal cavity, the battery cell holder includes a surface in facing relationship with the top housing portion, the surface configured to support the battery electronics, and the layer is configured to cover a portion of the surface.

Optionally, the battery electronics includes a printed circuit board and battery contacts extending therefrom, the battery pack interface includes a terminal block enclosing the battery contacts, and the layer is configured to cover a surface of the printed circuit board.

Optionally, the battery electronics includes a printed circuit board, the fluid is received in the internal cavity by an injection port, and an end of the injection port is positioned proximate a surface of the printed circuit board.

Optionally, the layer includes thermally conductive silicone encapsulant.

Other independent aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

Embodiments of the invention will now be described, by way of example, with reference to the accompanying drawings in which.

DETAILED DESCRIPTION

Figure 1:
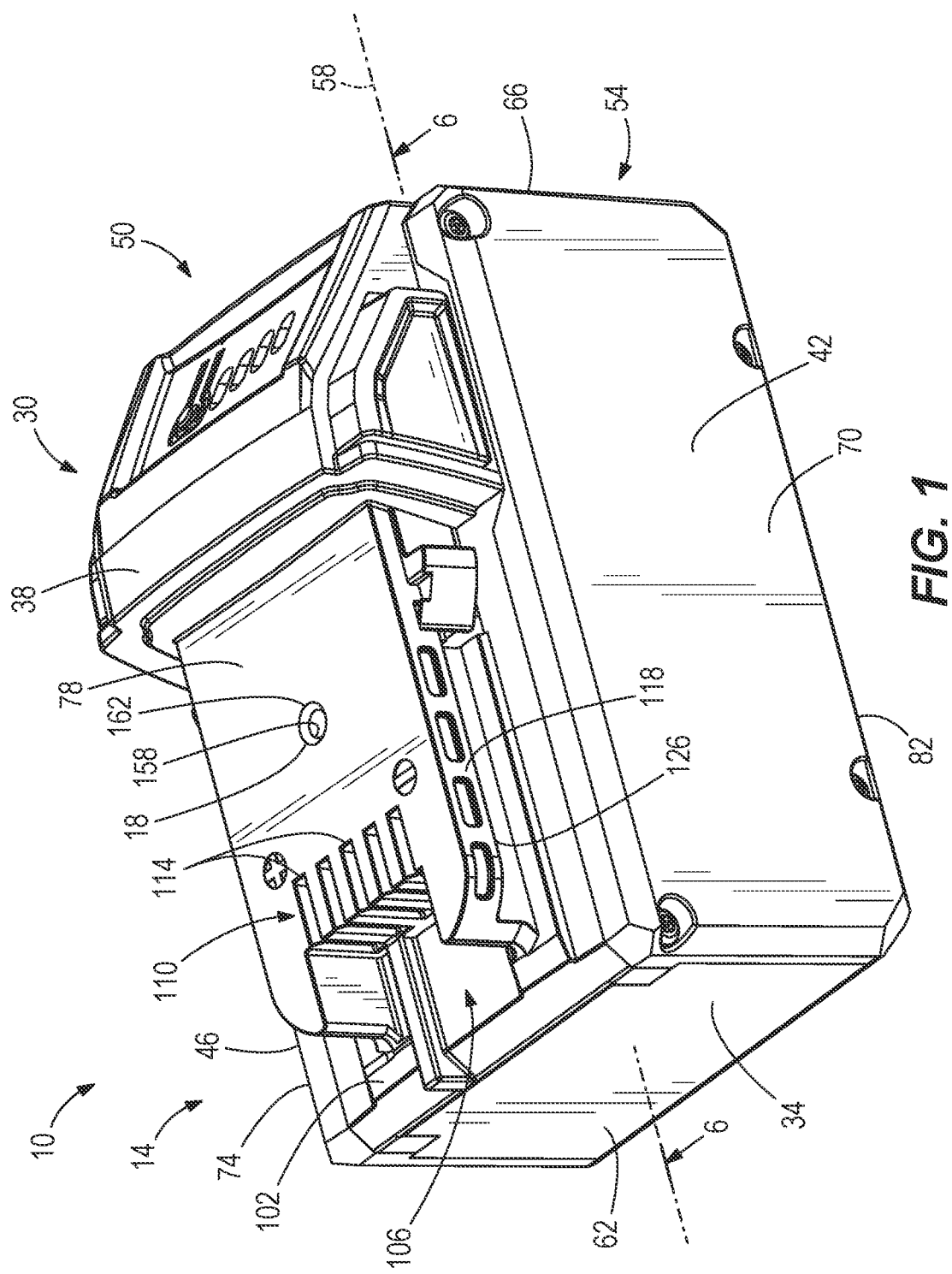
FIG. 1 is a perspective view of a battery pack assembly.
Figure 2:
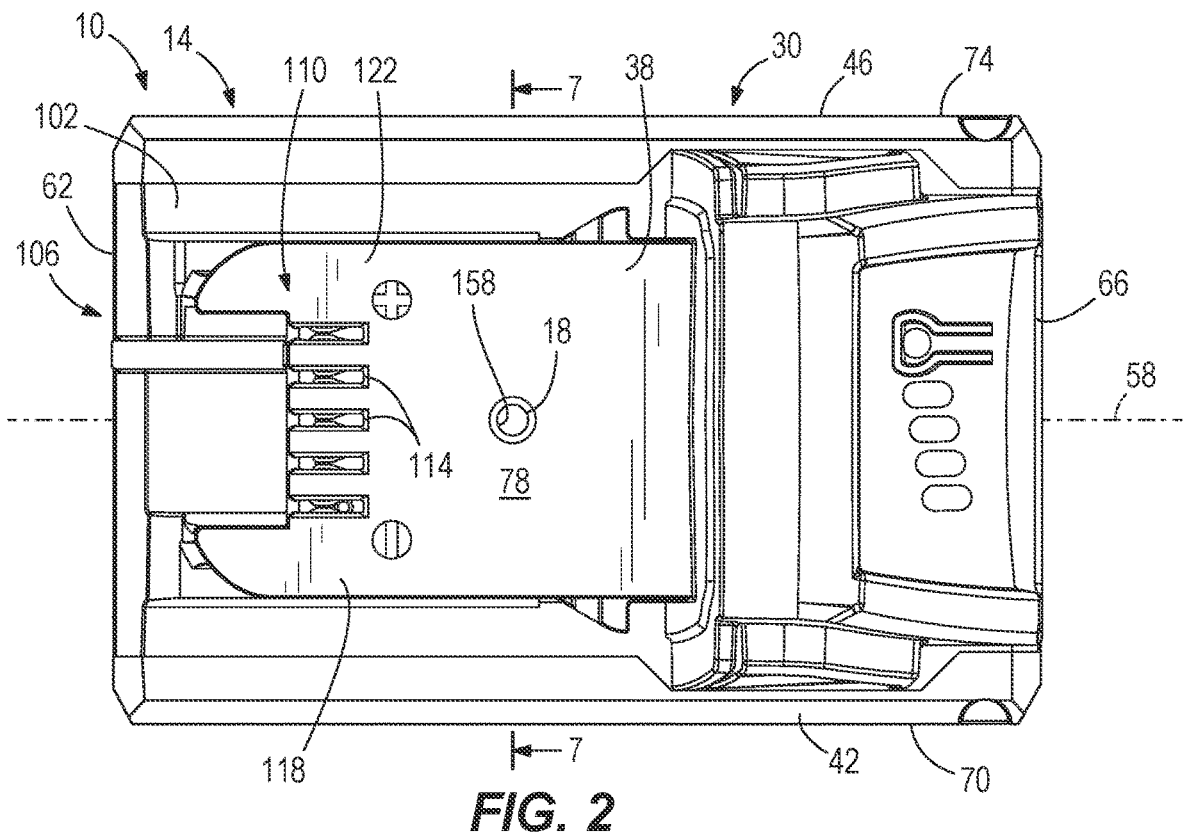
FIG. 2 is a top view of the battery pack assembly of FIG. 1.
Figure 3:
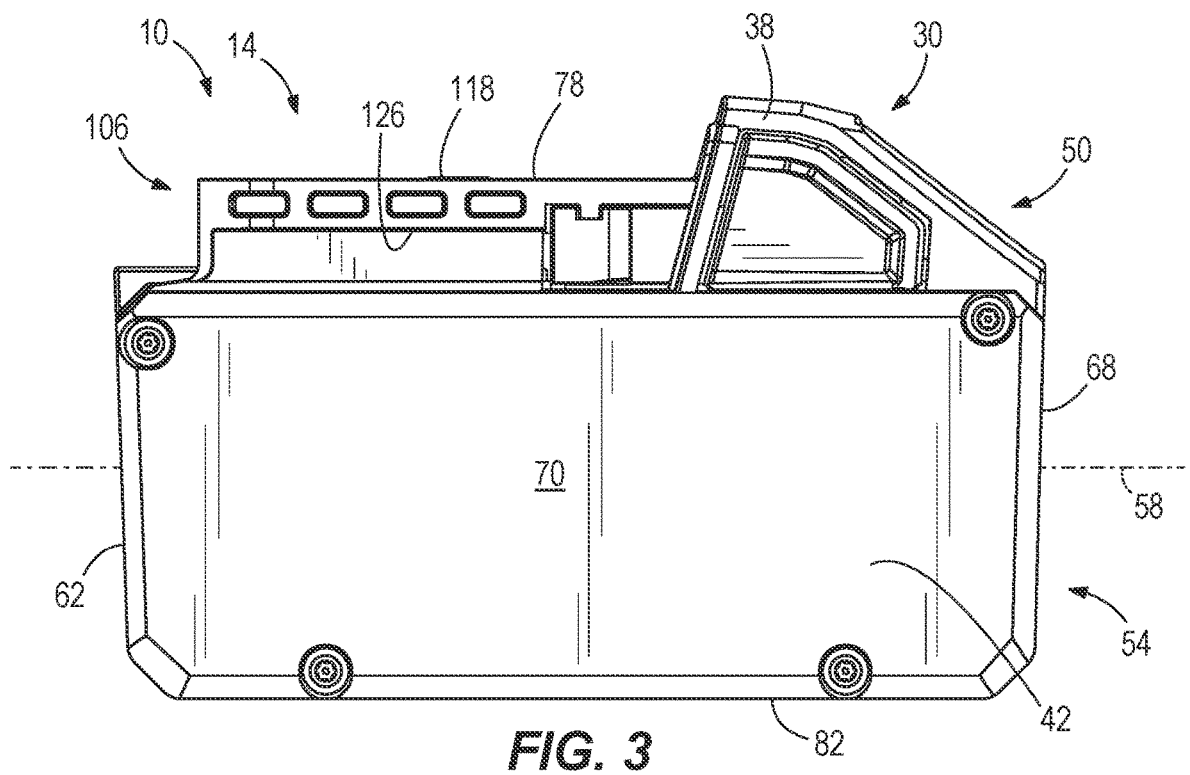
FIG. 3 is a side view of the battery pack assembly of FIG. 1.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

FIGS. 1-4 illustrate a battery pack assembly 10 including a battery pack 14 and an injection port 18. In the illustrated embodiment, the battery pack assembly 10 includes a high power battery pack 14 (e.g., having a nominal voltage of at least about 80 volts (V)) connectable to and operable to power various motorized power tools (e.g., a cut-off saw, a miter saw, a table saw, a core drill, an auger, a breaker, a demolition hammer, a compactor, a vibrator, a compressor, a drain cleaner, a welder, a cable tugger, a pump, etc.), outdoor tools (e.g., a chain saw, a string trimmer, a hedge trimmer, a blower, a lawn mower, etc.), other motorized devices (e.g., vehicles, utility carts, a material handling cart, etc.), etc. and non-motorized electrical devices (e.g., a power source, a light, an AC/DC adapter, a generator, etc.), any one of which is now referred to herein as "device."

The battery pack 14 includes a battery pack housing 30. The illustrated housing includes a body portion 34, a cover portion 38, and first and second side portions 42, 46 coupled to first and second sides, respectively, of the body portion 34. The cover portion 38 of the housing 30 may be referred to herein as a "top housing portion 50," and the body portion 34 and the first and second side 42, 46 portions may be collectively referred to herein as a "bottom housing portion 54." In other embodiments, the housing 30 may comprise one or more portions to form the housing 30. In addition, the housing 30 includes a longitudinal axis 58 extending therethrough.

The housing 30 includes a front side 62, a rear side 66, a first lateral side 70, a second lateral side 74 opposite the first lateral side 70, a top side 78, and a bottom side 82 opposite the top side 78. In the illustrated embodiments, the body portion 34 forms the front side 62, the rear side 66, and the bottom side 82. The first and second side portions 42, 46 form the first and second lateral sides 70, 74, respectively, and the cover portion 38 forms the top side 78 of the housing 30.

Figure 4:
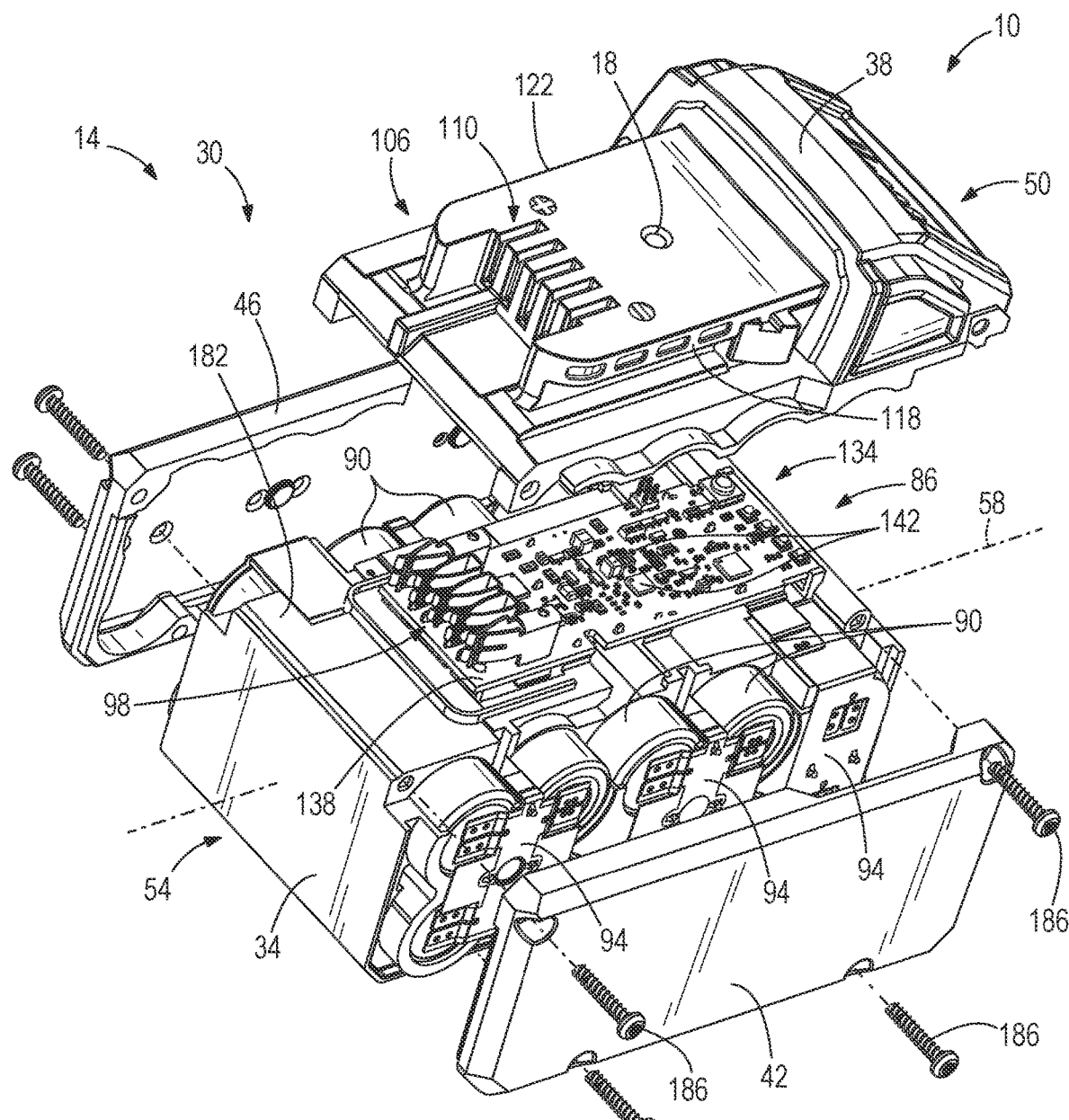
FIG. 4 is an exploded view of the battery pack assembly of FIG. 1.

With specific reference to FIG. 4, the housing 30 defines an internal cavity 86 in which one or more battery cells 90 are supported. More specifically, the body portion 34 is positioned within the internal cavity 86 and is configured to receive the battery cells 90. As such, the body portion 34 is configured as a battery cell holder that restrains the battery cells 90 within the internal cavity 86.

Each battery cell 90 may have a nominal voltage between about 3 V and about 5 V and may have a nominal capacity between about 2 Ah and about 6 Ah (in some cases, between about 3 Ah and about 5 Ah). The battery cells 90 may be any rechargeable battery cell chemistry type, such as, for example, lithium (Li), lithium-ion (Li-ion), other lithium-based chemistry, nickel-cadmium (NiCd), nickel-metal hydride (NiMH), etc.

Figure 9A:
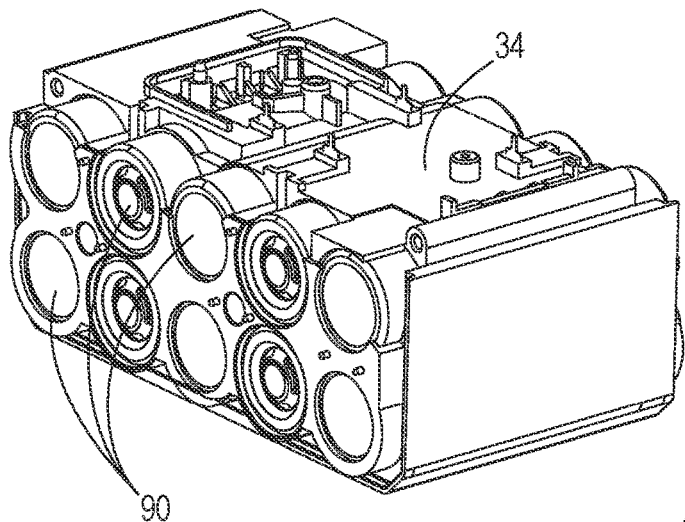
FIGS. 9A-9F are a series of diagrams illustrating a manufacturing process for the battery pack assembly of FIG. 1.
Figure 9B:
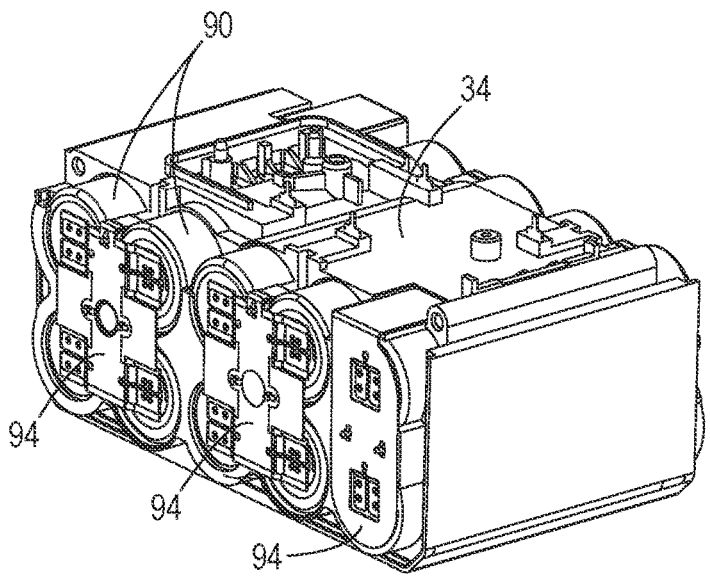
Figure 9C:
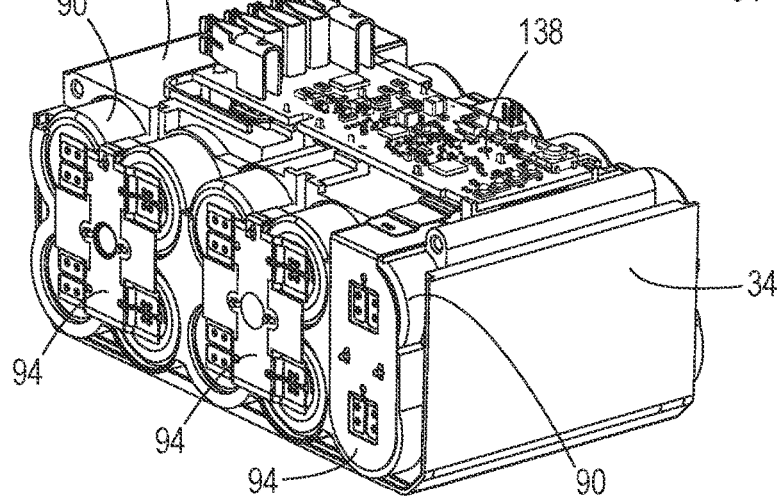
Figure 9D:
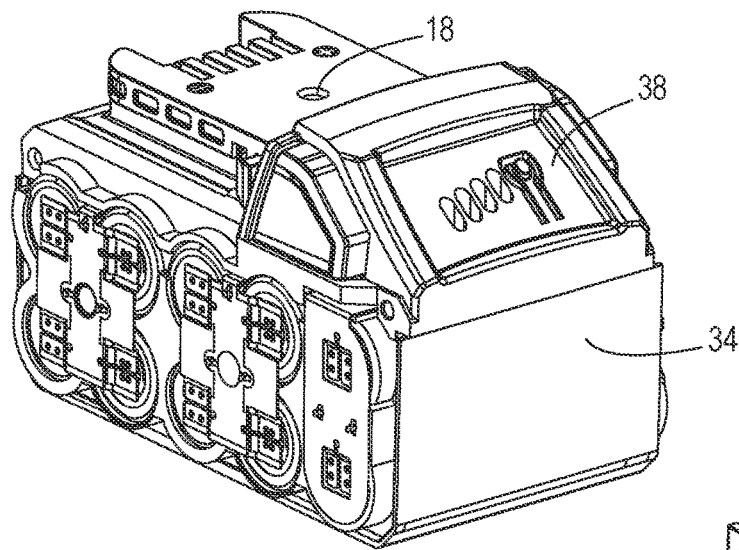
Figure 9E:
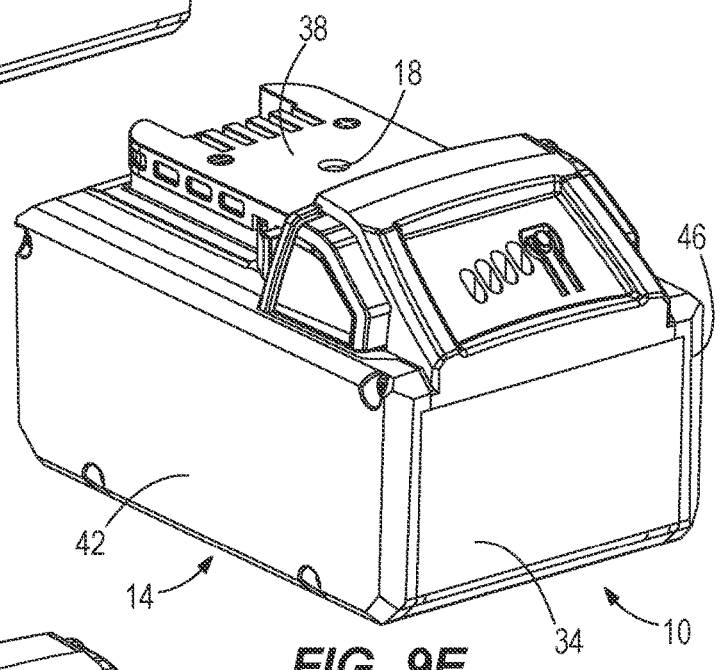

The battery cells 90 may be connected in series, parallel, or combination series-parallel to provide the desired electrical characteristics (e.g., nominal voltage, current output, current capacity, power capacity, etc.) of the battery pack 14. The battery cells 90 are connected together by battery straps 94 (FIG. 9B). In addition, the battery cells 90 are electrically coupled to battery contacts 98 (FIG. 4) supported within the housing 30 and configured to electrically and mechanically engage device contacts of the device to facilitate the transfer of electrical power between the device and the battery pack 14.

With reference to FIGS. 1-4, the top housing portion 50 includes a wall 102 and a battery pack interface 106 that extends from the wall 102. The battery pack interface 106 includes a terminal block 110 with openings 114 extending therethrough that allow access to the battery contacts 98 (FIG. 4) positioned within the housing 30. The terminal block 110 encloses the battery contacts 98. The battery pack interface 106 further includes rails 118, 122 and grooves 126, 130 positioned on opposite sides of the terminal block 110. In particular, the grooves 126, 130 are defined between the respective rail 118, 122 and the wall 102. The battery pack interface 106 is configured to selectively couple with a device interface having structure corresponding to the structure of the battery pack interface 106 (e.g., the device contacts and grooves/rails).

Figure 6:
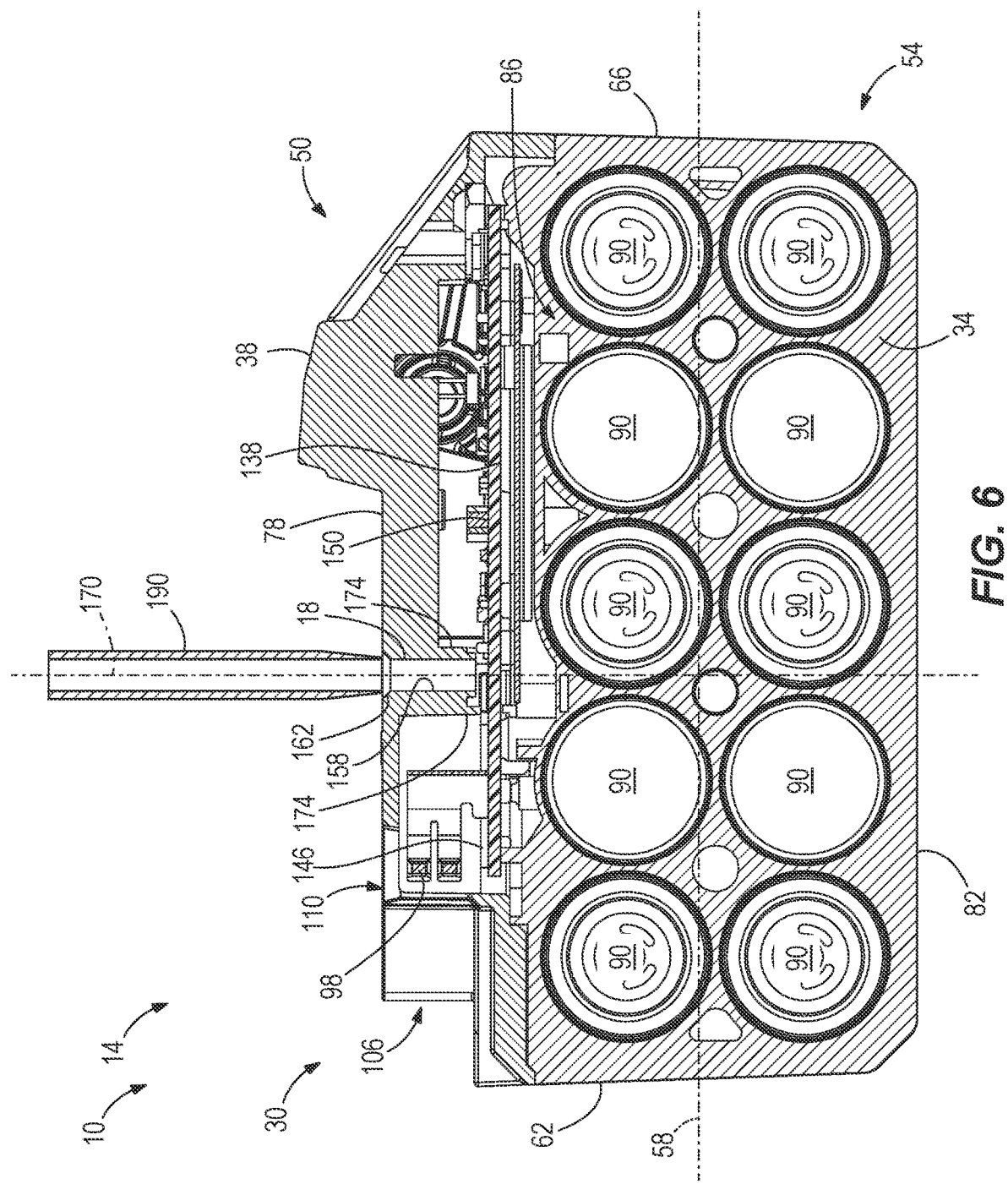
FIG. 6 is a cross-sectional view of the battery pack assembly of FIG. 1.

With reference to FIGS. 4 and 6, the battery pack 14 includes battery pack electronics 134 positioned within the housing 30. The battery pack electronics 134 include, among other things, a printed circuit board (PCB) 138, one or more electrical component(s) 142 (e.g., CPU, a transformer, FETs, etc.)), and the battery contacts 98. The PCB 138 is securably coupled to (e.g., by welding) and supported by the body portion 34. The top housing portion 50 includes an inner surface 146 opposite the wall 102 of the top housing portion 50. The PCB 138 includes a surface 150 in facing relationship with and spaced from the inner surface 146 (FIG. 6) of the top housing portion 50.

The battery contacts 98 are securably coupled to (e.g., by welding) and extend from the PCB 138 toward the inner surface 146 at one end of the PCB 138. An end of the battery contacts 98 are positioned adjacent the openings 114 of the terminal block 110. In addition, the battery contacts 98 are in electrical connection with the PCB 138.

With reference to FIGS. 1 and 5-7, the housing 30 includes the injection port 18. The injection port 18 includes one or more channels 158 positioned on one or more of the sides (e.g., top side 78, bottom side 82, front side 62, rear side 66, first lateral side 70, second lateral side 74) of the housing 30. In the illustrated embodiment, the injection port 18 includes a single channel 158 defined by the top housing portion 50 such that the channel 158 is positioned on the top side 78 of the housing 30. The channel 158 extends between a first end 162 located on the wall 102 though the top housing portion 50 (e.g., cover portion 38) to a second, opposite end 166 located on the inner surface 146 of the top housing portion 50. In other embodiments, the housing 30 may include multiple channels extending through the same or different sides of the housing 30 (e.g., two channels on the top side 78, or one channel on the top side 78 and another channel on the rear side 66, etc.). The injection port 18 connects the internal cavity 86 of the battery pack 14 to an exterior of the housing 30.

Figure 7:
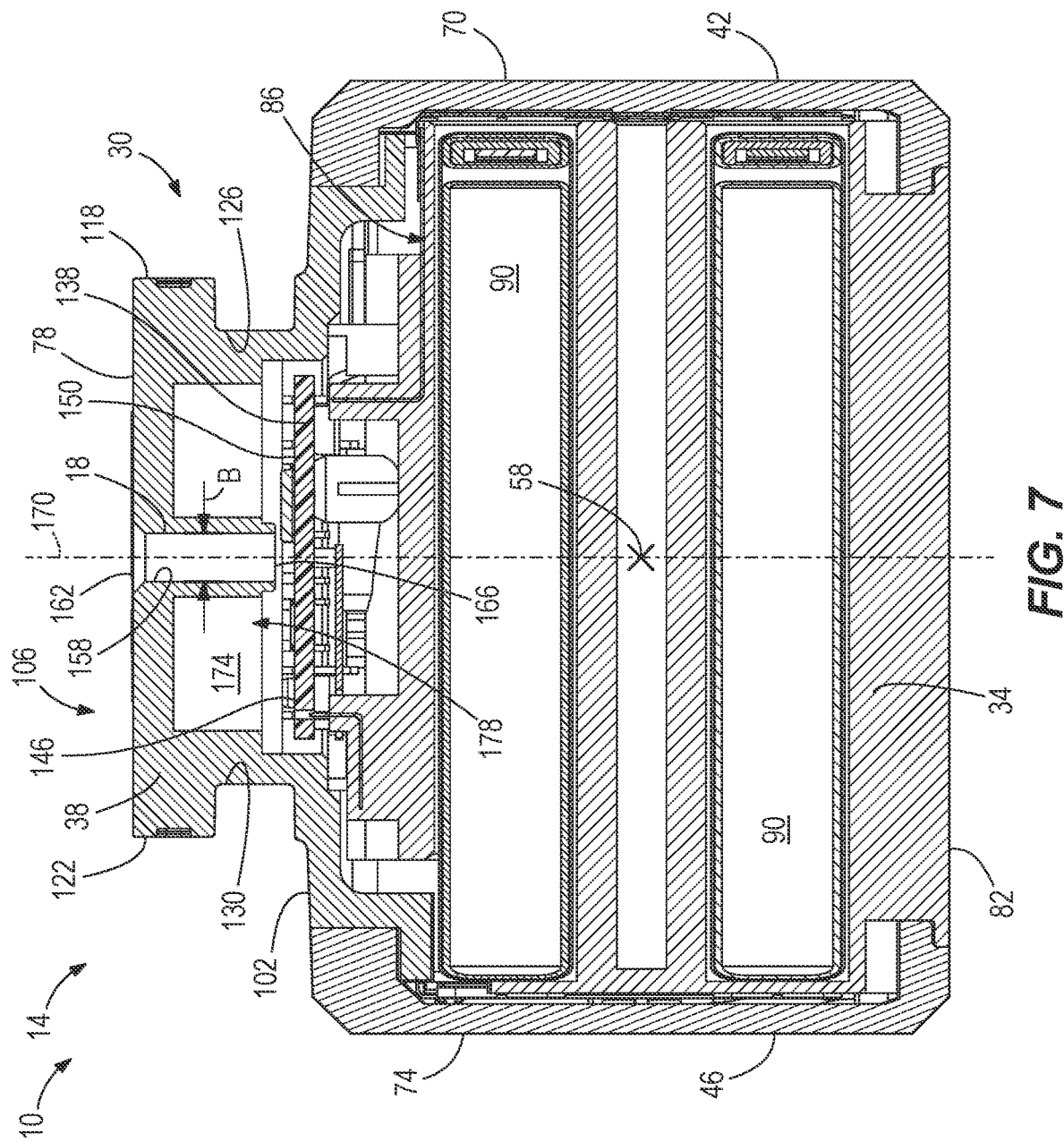
FIG. 7 is another cross-sectional view of the battery pack assembly of FIG. 1.
Figure 8:
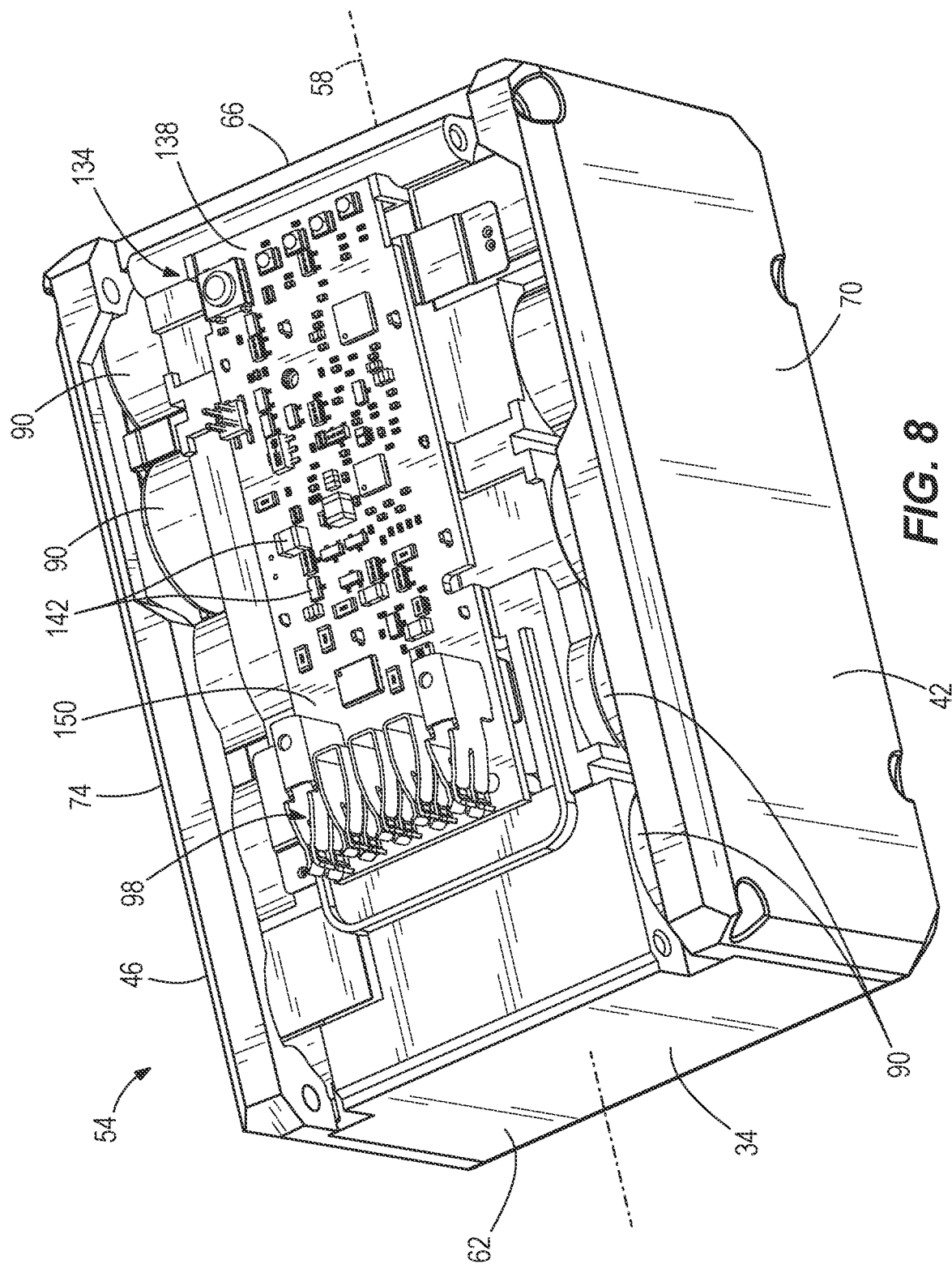
FIG. 8 is a top perspective view of a lower housing portion of the battery pack assembly.

With reference to FIGS. 6 and 7, the channel 158 extends along an injection axis 170. The injection axis 170 extends relative to the longitudinal axis 58. In the illustrated embodiment, the injection axis 170 extends at an angle A (e.g., ninety degrees) relative to the longitudinal axis 58. In other embodiments, the one or more channels 158 may be positioned such that the respective injection axis 170 extends parallel with the longitudinal axis 58. In addition, the illustrated injection axis 170 extends through the longitudinal axis 58 (FIG. 7), but may alternatively be spaced away from the longitudinal axis 58. When multiple channels 158 are provided, each injection axis 170 of the channels 158 may extend at the same or different angle A relative to the longitudinal axis 58, and/or the injection axis 170 of one, some, or all of the channels 158 may extend through or spaced away from the longitudinal axis 58.

With continued reference to FIGS. 6 and 7, the channel(s) 158 may be positioned closer to some of the sides 62, 66, 70, 74, 78, 82 of the housing 30 rather than the respective opposite sides 62, 66, 70, 74, 78, 82. For example, the illustrated channel 158 is positioned closer to the front side 62 of housing 30 than the rear side 66 of the housing 30 from the frame of reference of FIG. 6. The channel 158 is positioned equidistantly between the first and second lateral sides 70, 74 from the frame of reference of FIG. 7. As such, the injection port 18 is selectively positioned at a predetermined location on the housing 30.

The channel 158 is positioned proximate the terminal block 110. Furthermore, the second end 166 of the channel 158 is positioned proximate the surface 150 of the PCB 138. The channel(s) 158 is shaped and sized to allow a fluid to pass through the injection port 18 from the exterior of the housing 30 to the internal cavity 86. The illustrated channel 158 has a circular cross-sectional shape, and has a predetermined size B (e.g., diameter).

Figure 5:
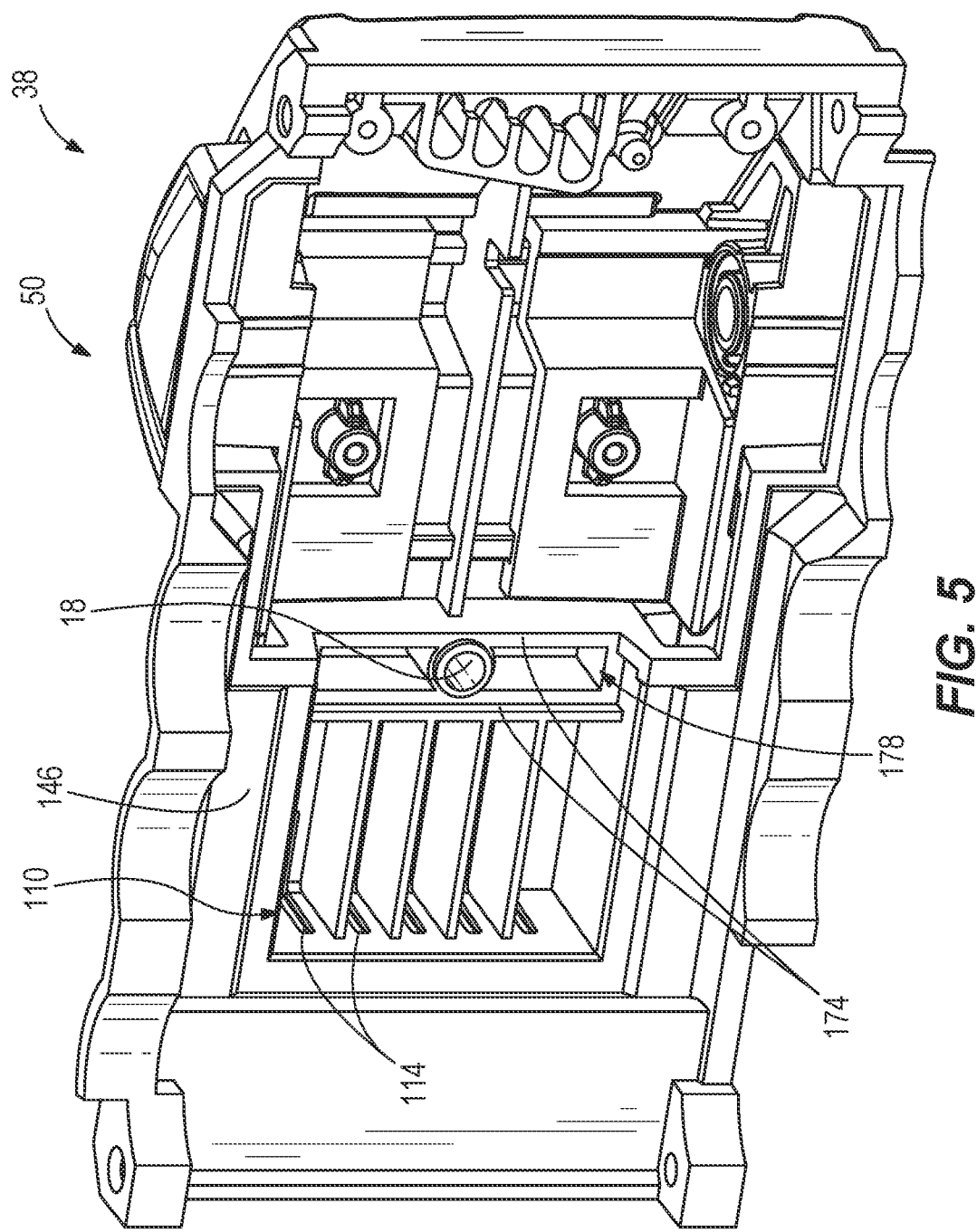
FIG. 5 is a bottom perspective view of a top housing portion of the battery pack assembly of FIG. 1.

With reference to FIGS. 5-7, the battery pack assembly 10 further includes a plurality of guide members 174. Each guide member 174 is configured as a wall extending from the inner surface 146 of the top housing portion 50 (FIG. 5). An end of each guide member 174 is spaced from the PCB 138 (FIGS. 6-7). The guide members 174 define a chamber 178 within the internal cavity 86 in which the injection port 18 extends through. The chamber 178 is positioned adjacent the PCB 138 (e.g., above from the frame of reference of FIG. 7). In addition, with particular reference to FIG. 6, the chamber 178 separates the terminal block 110 from the remaining space above the surface 150 of the PCB 138 within the internal cavity 86 in an axial direction relative to the longitudinal axis 58. The plurality of guide members 174 are configured to direct the fluid from the injection port 18 to other portions of the internal cavity 86.

The internal cavity 86 of the battery pack is configured to receive the fluid such as during assembly of the battery pack 14. In particular, the internal cavity 86 has a volume, and each of the components of the battery pack 14 (e.g., the battery cells 90, PCB 138, etc.) and the fluid occupies a predetermined percentage of the volume. For example, in some embodiments, the battery pack components occupy at least seventy-five percent of the volume and the fluid occupies fifteen percent or less of the volume. As such, the fluid is configured to fill in gaps between the battery pack components and inner surfaces of the housing 30. Still further, in some embodiments, the fluid may not fill in some of the gaps such that a portion of the volume (e.g., ten percent or less) of the internal cavity 86 may not be occupied by the battery pack components or the fluid. This portion of the volume may be referred to herein as "unoccupied space" of the internal cavity 86. In the illustrated embodiment, the unoccupied space is located within a portion of the internal cavity 86 defined by the top housing portion 50 (e.g., proximate the inner surface 146 of the top housing portion 50 and proximate the battery contacts 98).

In some embodiments, the battery pack components occupy between eighty percent and eighty-five percent of the volume, the fluid occupies five to fifteen percent of the volume, and the remaining volume is unoccupied space. In further embodiments, the battery pack components occupy between eighty-five percent and ninety percent of the volume, the fluid occupies five to fifteen percent of the volume, and the remaining volume is unoccupied space. In further embodiments, the battery pack components occupy between ninety percent and ninety-five percent of the volume, the fluid occupies between two percent and five percent of the volume, and the remaining volume is unoccupied space.

The fluid comprises an adhesive material (e.g., glue). In the illustrated embodiment, the fluid is 905 two-part addition-cure thermally conductive silicone encapsulant. The adhesive material is configured to be poured into the battery pack 14 (e.g., via the injection port 18) until the adhesive material occupies the predetermined volume of the internal cavity 86, and then is allowed to cure to become a hardened coating or layer 188 (FIG. 9H) within the battery pack 14. In particular, the fluid is configured to cover one, some, or all of the ends of the battery cells 90, an upper surface 182 (FIG. 4) of the body portion 34, and/or the surface 150 of the PCB 138 (i.e., including the electrical components 142 of the PCB 138 as shown in FIG. 9G). The fluid is distributed within the internal cavity 86 (e.g., such as by the guide members 174 and gravity) such that at least the end portion of each of the battery contacts 98 is not covered by the adhesive material. Once hardened, the adhesive material is configured to form a surface within the internal cavity 86.

As shown in Table 1 below, the 905 two-part addition-cure thermally conductive silicone encapsulant adhesive material may be manufactured such that some of the properties such as thermal conductivity (W/m-K), density (g/cm$^3$), volume resistivity (Ω·cm), and mixing viscosity (mPa-sec) of the adhesive material may vary. For example, TDS-905 (G11) has a thermal conductivity equal to 0.7 or greater, and TDS-9225 (G91) has a thermal conductivity equal to 3.0 or greater. In addition, TDS-905 (G11) has a volume resistivity equal to $1.0*10^{13}$, and TDS-9225 (G91) has a volume resistivity greater than $1.0*10^{12}$.

TABLE 1

Types of adhesive material illustrating the differences in properties. (Each of the types of the 905 two-part addition-cure thermally conductive silicone encapsulant adhesive material may be commercially available from supplier, Shenzhen Anpin Silicone Material co., Ltd.)

| Glue type | Thermal conductivity W/m-K | Density g/cm3 | Volume resistivity Ω · cm | Mixing Viscosity mPa-sec |
|---|---|---|---|---|
| TDS-905 (G11) | ≥0.7 | 1.51 ± 0.05 (A part) 1.55 ± 0.05 (B part) | $1.0 * 10^{13}$ | 1200 ± 300 |
| TDS-905 (G18) | 0.4~0.45 | 1.22 ± 0.05 (A part) 1.25 ± 0.05 (B part) | $≥1.0 * 10^{14}$ | 1000~1500 |
| TDS-9225 (G22) | ≥2.5 | 2.86 ± 0.05 (A part) 2.86 ± 0.05 (B part) | $>1.0 * 10^{12}$ | 1500~2000 |
| TDS-905 (G39) | 0.25 ± 0.05 | 0.67 ± 0.05 (A part) 0.67 ± 0.05 (B part) | $≥1.0 * 10^{13}$ | 1200 ± 300 |
| TDS-9225 (G42) | ≥1.2 | 2.4 ± 0.05 (A part) 2.4 ± 0.05 (B part) | $≥1.0 * 10^{12}$ | 2500~3500 |
| TDS-9225 (R43) | ≥1.9 | 2.81 ± 0.05 (A part) 2.81 ± 0.05 (B part) | $>1.0 * 10^{12}$ | 3000 ± 300 |
| TDS-9225 (G52) | ≥0.9 | 2.0 ± 0.05 (A part) 2.0 ± 0.05 (B part) | $≥1.0 * 10^{12}$ | 2500~3500 |
| TDS-9225 (G62) | ≥1.5 | 2.1 ± 0.1 (A part) 2.1 ± 0.1 (B part) | $≥1.0 * 10^{12}$ | 6000~7000 |
| TDS-9225 (G91) | ≥3.0 | 2.94 ± 0.05 (A part) 2.94 ± 0.05 (B part) | $>1.0 * 10^{12}$ | 9500~11500 |

FIGS. 9A-9F illustrates one example of a manufacturing process for the battery pack assembly 10 of FIG. 1. In step one, with reference to FIG. 9A, the battery cells 90 and the battery cell holder (i.e., body portion 34) are provided. Each of the battery cells 90 is received in (e.g., pushed into) the battery cell holder 34. In step two, with reference to FIG. 9B, the battery strap 94 is secured (e.g., by welding) to the ends of each of the battery cells 90. In step three, with reference to FIG. 9C, the PCB 138 is secured (e.g., by welding) to the upper surface 182 of the body portion 34. In step four, with reference to FIG. 9D, the top housing portion 50 (having the injection port 18) is positioned on the body portion 34 of the bottom housing portion 54. In step five, with reference to FIG. 9E, the first and second side portions 42, 46 are positioned on the first and second sides of the body portion 34. Fasteners (e.g., screws 186; FIG. 4) extending through the first and second side portions 42, 46 secure the entire assembly together. In the illustrated embodiment, four fasteners 186 are used on each lateral side 70, 74 of the housing 30. In step six, with reference to FIG. 9F, the fluid is injected into the internal cavity 86 of the housing 30 using the injection port 18. In the illustrated embodiment, a tube 190 is aligned with the injection axis 170 of the channel 158, and the fluid is directed through the tube 180 into the channel 158. As such, the fluid is received in the internal cavity 86 by a single injection of the fluid.

Figure 9F:
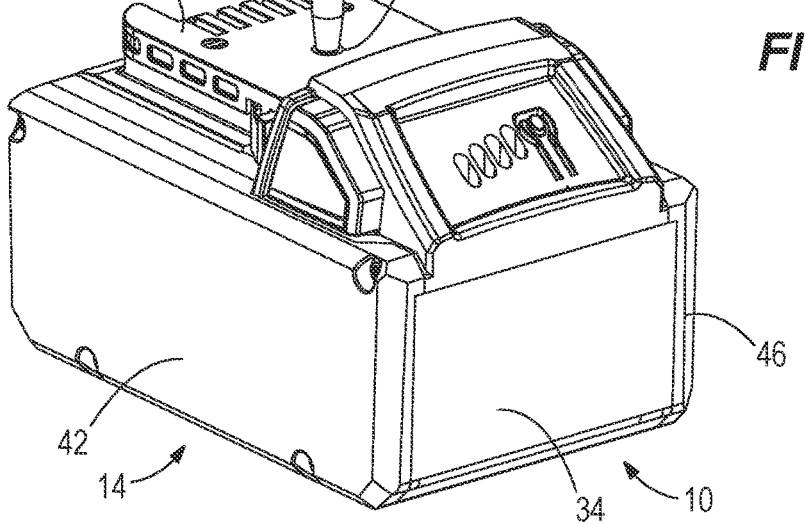
Figure 9G:
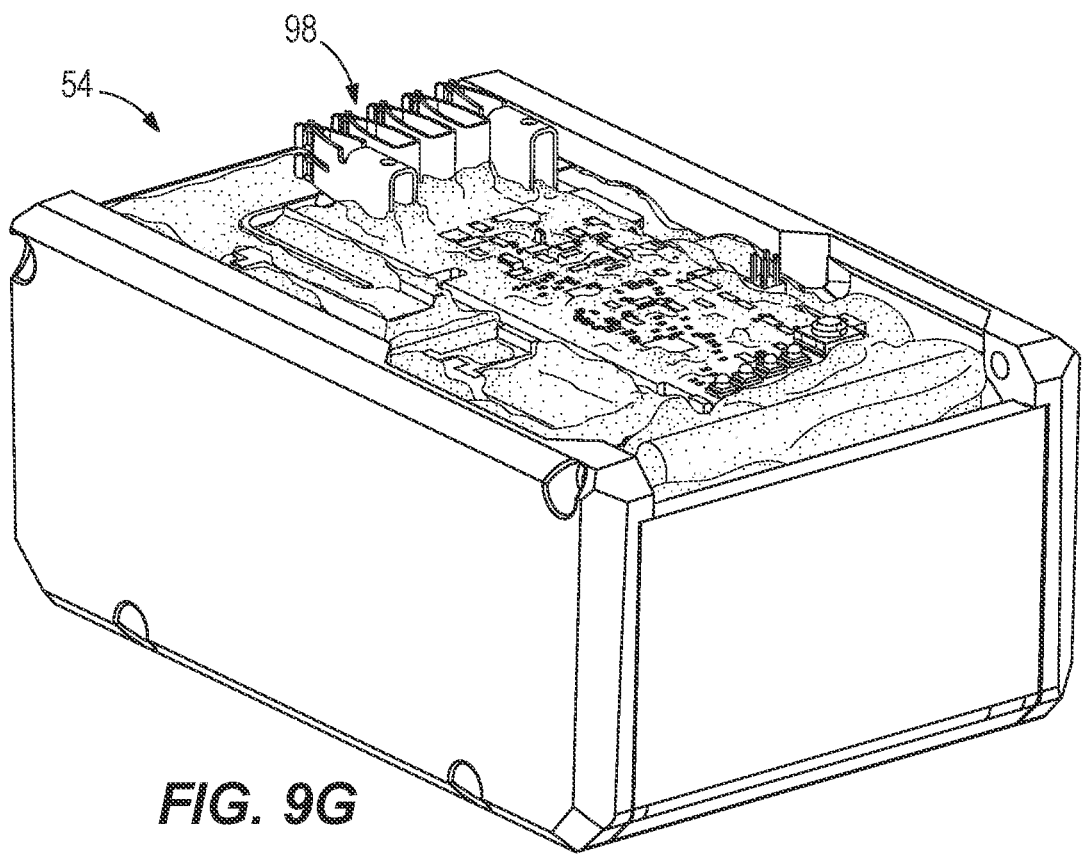
FIGS. 9G-9H illustrate adhesive material positioned within the battery pack during another example of a manufacturing process for the battery pack assembly of FIG. 1.
Figure 9H:
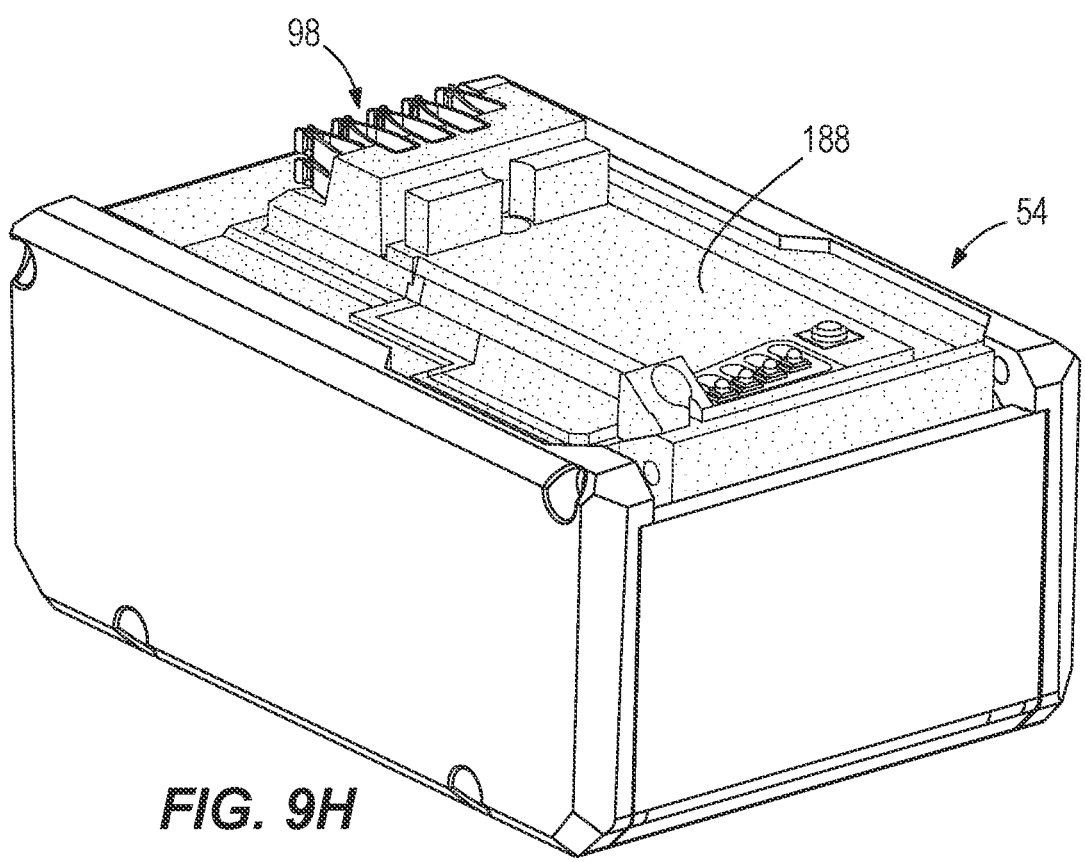

In other embodiments, as shown in FIGS. 9G-9H, the bottom housing portion 54 is assembled first (e.g., the body portion 34 and the first and second side portions 42, 46 are coupled together), and some of the fluid is received in (e.g., injected into) the bottom housing portion 54 (FIG. 9G) before the top housing portion 50 is coupled to the bottom housing portion 54. The remaining fluid is then received in the internal cavity 86 of the completed assembly using the injection port 18 of the top housing portion 50. FIG. 9H illustrates the fluid positioned within the internal cavity 86 after the remaining fluid is received in the internal cavity 86 and the top housing portion 50 is decoupled from the bottom housing portion 54. As such, the fluid is received in the internal cavity 86 by at least two injections of the fluid.

In further other embodiments, the battery pack 14 is completely assembled (i.e., by steps one through five in FIGS. 9A-9E), and then the battery pack 14 is positioned within a vacuum, before initiating step six of injecting the fluid into the internal cavity 86 of the battery pack 14 (FIG. 9F).

The adhesive material is configured to be thermally conductive. For example, as shown in Table 2 below, a thermal test of multiple battery packs was tested at three different discharges: 40 A, 50 A, and 60 A. Temperature sensors T1-T6 were positioned at six different locations, respectively, within the back pack: T1 positioned on the upper surface 182 of the body portion 34 proximate one end of the PCB 138, T2 position on the upper surface 182 of the body portion 34 proximate the opposite end of the PCB 138 having the battery contacts 98, T3-T5 are positioned on the ends of respective battery cells 90, and T6 is positioned on the bottom side 82 of the housing 30. Each the temperature sensor determines a temperature reading at the respective location. The battery packs 14 with adhesive material (e.g., battery packs 3 # and 4 #) has an overall lower temperature at each of the six locations during discharging of the respective battery pack 14 in comparison to the battery packs without adhesive material. As such, the battery packs 14 with adhesive material facilitates thermal conduction of heat away from the battery cells 90 and battery cell holder 34 as the battery cells 90 are being discharged. Accordingly, the adhesive material may increase thermal performance of the battery pack 14, which thereby may improve battery pack cycle life and cycle running time.

addition, the adhesive material is configured to withstand a temperature range between −50° C. to 200° C., is not configured to shrink during curing, and/or is configured to be non-corrosive.

Figure 10:
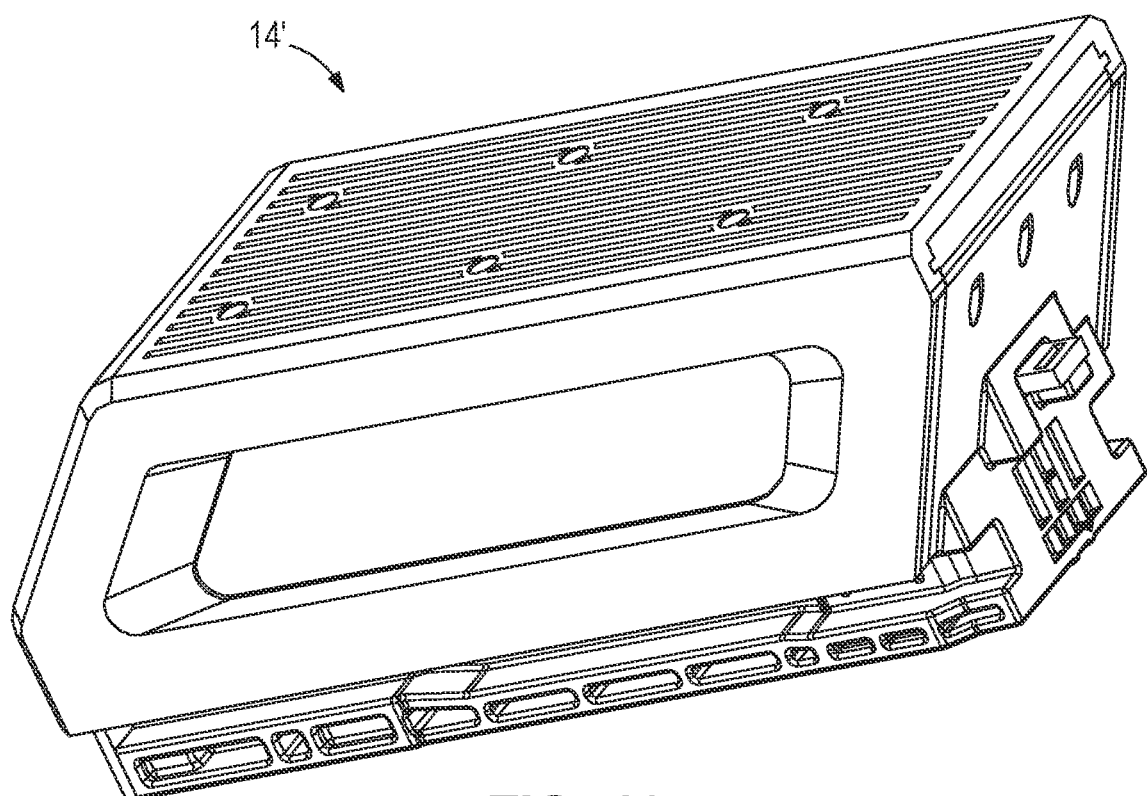
FIG. 10 is another example of a battery pack of the battery pack assembly of FIG. 1

FIG. 10 illustrates another example of a battery pack 14' of the battery pack assembly 10 that may include like component and features as the embodiment of the battery pack 14 shown in FIGS. 1-9F above. Accordingly, the discussion of the battery pack assembly 10 above similarly applies to the battery pack 14 and is not re-stated. In particular, the battery pack 14' may include the injection port 18 having the one or more channels 158 configured to direct the fluid into an internal cavity of the battery pack 14.

Although the invention has been described in detail with reference to certain preferred embodiments, variations and modifications exist within the scope and spirit of one or more independent aspects of the invention as described.

One or more independent features and/or independent advantages of the invention may be set forth in the claims.

What is claimed is:

1. A battery pack assembly comprising:
   a housing having a plurality of sides and defining an internal cavity;
   a plurality of battery cells received in the internal cavity;
   battery electronics received in the internal cavity;
   a battery pack interface supported by the housing and connectable to a device, wherein the battery electronics includes a printed circuit board; and
   a layer comprising adhesive material positioned within the internal cavity between a portion of the battery cells, a portion of the battery electronics, and a plurality of inner surfaces of the housing,
   wherein the adhesive material comprises two-part addition-cure thermally conductive silicone encapsulant,
   wherein the layer has a continuous surface covering the portion of the battery cells and the portion of the battery electronics,
   wherein the layer is injectable, as a fluid that is configured to harden to form the layer, into the internal cavity, and
   wherein the layer is configured to cover a top surface of the printed circuit board.

TABLE 2

Test results of thermal testing of battery packs with and without adhesive material at three different discharges: 40 A, 50 A, and 60 A.

| E-Load | | | | | | | | | Pack Performance | | |
|---|---|---|---|---|---|---|---|---|---|---|---|
| Discharge Current | Pack | | Max Temperature (° C.) | | | | | | Run time | Capacity | Energy |
| (A) | Type | Pack # | T1 | T2 | T3 | T4 | T5 | T6 | (mm:ss) | (Ah) | (Wh) |
| 40 A Discharge | Glue Injection | 3# | 58.89 | 61.948 | 60.03 | 60.75 | 61.495 | 61.514 | 11:25 | 7.6754 | 123.38 |
| | | 4# | / | 60.366 | 60.038 | 55.679 | 58.946 | 62.242 | 11:20 | 7.6156 | 122.4 |
| | No Glue Injection | 5# | 73.946 | 74.48 | 76.669 | 76.469 | 75.492 | 58.852 | 11:25 | 7.6965 | 124.47 |
| | | 6# | 75.16 | 77.32 | 75.96 | 77.02 | 76.58 | 66.91 | 11:15 | 7.5813 | 122.61 |
| 50 A Discharge | Glue Injection | 3# | 68.95 | 74.28 | 69.63 | 70.54 | 70.68 | 70.55 | 9:20 | 7.5936 | 119.6 |
| | | 4# | / | 69.99 | 67.62 | 57.96 | 65.45 | 67.21 | 8:55 | 7.471 | 117.2 |
| | No Glue Injection | 5# | 87.85 | 90.39 | 86.67 | 88.85 | 85.96 | 70.74 | 8:55 | 7.5341 | 118.92 |
| | | 6# | 84.58 | 88.57 | 84.35 | 84.45 | 83.71 | 68.72 | 9:05 | 7.506 | 118.46 |
| 60 A Discharge | Glue Injection | 3# First | 74.968 | 82.677 | 74.705 | 76.014 | 75.587 | 72.634 | 7:20 | 7.264 | 110.88 |
| | | 3# Second | 75.87 | 83.34 | 75.3 | 75.88 | 76.4 | 75.21 | 7:10 | 7.221 | 110.56 |
| | | 4# | / | 78.64 | 73.97 | 64.2 | 71.98 | 73.3 | 7:20 | 7.299 | 111.8 |
| | No Glue Injection | 5# First | 100.36 | 102.74 | 94.95 | 99.29 | 94.53 | 71.58 | 7:15 | 7.285 | 111.9 |
| | | 5# Second | 97.105 | 98.194 | 91.053 | 95.168 | 91.114 | 67.297 | 6:15 | 6.351 | 95.76 |
| | | 6# | 99.74 | 105.38 | 97.12 | 95.33 | 94.41 | 71.07 | 7:20 | 7.321 | 113.12 |

The adhesive material is configured to inhibit ingress of water and/or moisture, and/or increase a strength of the battery pack housing 30. More specifically, the adhesive material is configured to form a barrier between the battery pack components (battery cells 90, PCB 138, etc.) and exterior of the housing 30. As such, water and/or moisture is inhibited from reaching the internal cavity 86 of the battery pack housing 30. The adhesive material is also configured to eliminate space between various structures/components contained in the battery pack 14, and couple the battery pack components to the inner surfaces of the housing 30, as well as to each other. As such, the strength of the housing 30 increased (e.g., such as if the battery pack 14 is dropped). In 2. The battery pack assembly of claim 1, further comprising an injection port configured to direct the fluid from exterior of the battery pack into the internal cavity.

3. The battery pack assembly of claim 2, wherein the housing includes a top housing portion and a bottom housing portion, and wherein the top housing portion includes the injection port.

4. The battery pack assembly of claim 3, wherein the bottom housing portion includes a battery cell holder configured to retain the plurality of battery cells within the internal cavity, wherein the battery cell holder includes a surface in facing relationship with the top housing portion, the surface configured to support the battery electronics, and wherein the layer is configured to cover a portion of the surface.

5. A battery pack assembly comprising:
- a housing having a plurality of sides and defining an internal cavity;
- a plurality of battery cells received in the internal cavity;
- battery electronics received in the internal cavity and including:
  - a printed circuit board, and
  - battery contacts extending from the printed circuit board;
- a battery pack interface supported by the housing and connectable to a device, wherein the battery pack interface includes a terminal block enclosing the battery contacts; and
- a layer comprising adhesive material positioned within the internal cavity between a portion of the battery cells, a portion of the battery electronics, and a plurality of inner surfaces of the housing,
- wherein the layer has a continuous surface covering the portion of the battery cells and the portion of the battery electronics,
- wherein the layer is injectable, as a fluid-that is configured to harden to form the layer, into the internal cavity,
- wherein the layer is configured to cover a top surface of the printed circuit board, and
- wherein an end portion of each of the battery contacts is not covered by the adhesive material.

6. A battery pack assembly comprising:
- a housing having a plurality of sides and defining an internal cavity;
- a plurality of battery cells received in the internal cavity;
- battery electronics received in the internal cavity;
- a battery pack interface supported by the housing and connectable to a device, wherein the battery electronics includes a printed circuit board; and
- a layer comprising adhesive material positioned within the internal cavity between a portion of the battery cells, a portion of the battery electronics, and a plurality of inner surfaces of the housing,
- wherein the layer has a continuous surface covering the portion of the battery cells and the portion of the battery electronics,
- wherein the layer is injectable, as a fluid-that is configured to harden to form the layer, into the internal cavity,
- wherein the fluid is received in the internal cavity by an injection port,
- wherein an end of the injection port is positioned to direct the fluid toward the top surface of the printed circuit board,
- wherein the injection port includes one or more channels positioned on one or more of the sides of the housing, each channel connecting the internal cavity to an exterior of the battery pack assembly, and
- wherein the layer is configured to cover a top surface of the printed circuit board.

* * * * *